United States Patent [19]

Cohn

[11] Patent Number: 5,012,872
[45] Date of Patent: May 7, 1991

[54] GOLF CLUB RAKE

[76] Inventor: Bernard Cohn, 16300 Golf Club Rd., Fort Lauderdale, Fla. 33326

[21] Appl. No.: 614,594

[22] Filed: Nov. 16, 1990

[51] Int. Cl.⁵ .......................... A01D 7/00; A63B 57/00
[52] U.S. Cl. .................................. 172/380; 273/32 B; 273/32 F; 273/162 E; 294/19.2; 56/400.04
[58] Field of Search ........... 273/162 R, 162 B, 162 E, 273/162 F, 172, 32 R, 32 B, 32 F; 172/378, 379, 380; 294/19.2; 56/400.04

[56] References Cited

U.S. PATENT DOCUMENTS 4,216,831  8/1980  Ritchie ............................... 172/380
4,871,029  10/1989  Rosin ........................... 273/194 A X Primary Examiner—George J. Marlo
Attorney, Agent, or Firm—Norman E. Lehrer

[57] ABSTRACT

A rake head for attachment to the tapered handle of a golf club includes a pair of rake blades which are pivoted together. One of the blades includes a collar for removably attaching the rake head to the handle. The blades are movable between an open position wherein they are in alignment with each other and resemble a rake and a closed position wherein one blade substantially overlies the other so that the device can be easily carried in one pocket. The blades are moved into their closed position by pivoting them downwardly away from the collar.

2 Claims, 2 Drawing Sheets

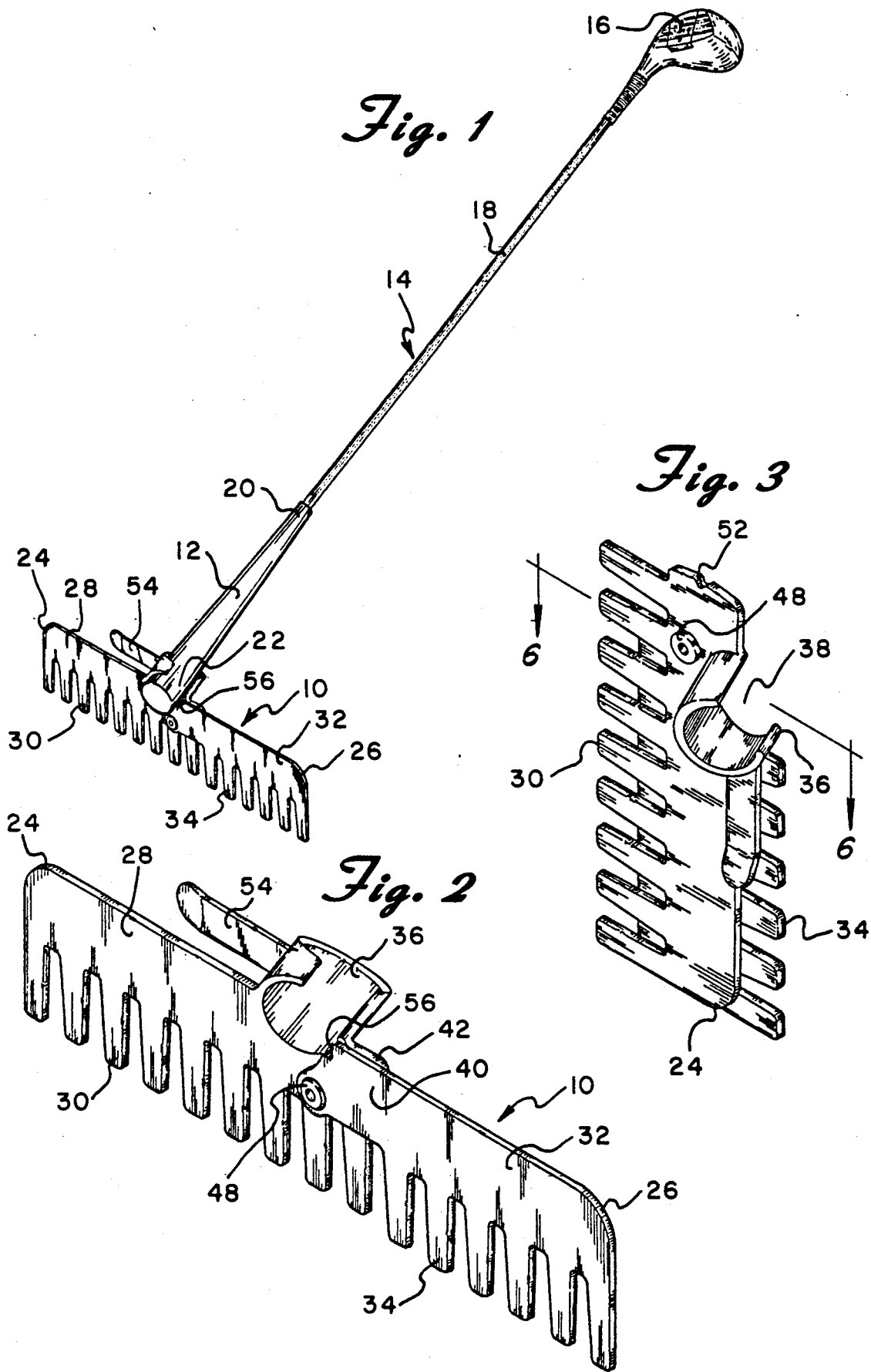

GOLF CLUB RAKE

BACKGROUND OF THE INVENTION

The present invention is directed toward a golf club rake and, more particularly, toward a collapsible rake head which is adapted to be temporarily attached to the tapered handle of a golf club.

Inevitably, all golfers including professionals occasionally find themselves in a sand trap. Golf etiquette requires a player to fill and smooth his footprints and depressions left in the sand after he has hit a golf ball out of the sand trap. In order to accomplish this, many golf courses may leave a rake or the like in the vicinity of the sand traps. Unfortunately, these rakes tend to disappear which not only adds substantial cost to the operation of the golf course but also makes it impossible to properly restore the surfaces of the sand traps.

In an attempt to alleviate this problem, rakes have been proposed in the past which are comprised essentially of a rake head which is adapted to be connected to the end of the golf club. One such rake head is shown, for example, in U.S. Pat. No. 2,721,755 to Walner. The Walner rake head appears to be very similar in size to a standard rake and is adapted to be secured to the handle portion of the golf club. When removed from the golf club, however, the Walner rake head is relatively large, thereby making it very difficult and inconvenient for a golfer to carry the same around with him.

U.S. Pat. No. 3,870,300 to Amendola shows a golf tee holder which holds a row of six or seven golf tees and also includes a means for securing the same to the handle of the golf club. While the golf tee holder of Amendola can function as a rake and is smaller than the Walner device and, therefore, more easily carried about, it appears to be so small as to be relatively inefficient for raking purposes.

U.S. Pat. No. 4,216,831 to Ritchie attempts to improve on both Walner and Amendola by providing a collapsible rake head which is smaller than Walner and, therefore, allegedly easier to carry but larger than Amendola so that it can more efficiently function as a rake. The Ritchie device includes a center mounting bracket and a pair of rake blades that are pivotally secured to either side of the mounting bracket. The rake blades are rotatable between an open position where they are in line with each other and can function as a rake and a closed position wherein the blades are rotated upwardly for storage or carrying.

Although Ritchie solves some of the problems of the Walner and Amendola patents, it creates additional problems. When the rake head of Ritchie is folded into its collapsed position, the two rake blade halves are spaced apart from each other with the teeth extending outwardly in opposite directions. Because of the width of the collapsed rake head and the protruding rake teeth, it is extremely difficult, if not impossible, to slip the collapsed rake head into a golfer's pocket and it is also difficult to carry the same in a golf bag. Furthermore, when utilizing any rake, there are upward forces asserted on the sides of the rake head. Since the Ritchie device collapses by folding the two blade halves upwardly, his rake head may tend to collapse when the same is in use.

SUMMARY OF THE INVENTION

The present invention is designed to overcome all of the deficiencies of the various prior art products discussed above so that the same can be conveniently and efficiently used by a golfer. The rake head of the invention is adapted to be attached to the tapered handle of a golf club and includes a pair of rake blades which are pivoted together. One of the blades includes a collar for removably attaching the rake head to the handle. The blades are movable between an open position wherein they are in alignment with each other and resemble a rake and a closed position wherein one blade substantially overlies the other so that the device can be easily carried in one pocket. The blades are moved into their closed position by pivoting them downwardly away from the collar.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

FIG. 1 is a front perspective view of a rake head constructed in accordance with the principles of the present invention and shown attached to the tapered handle of a golf club so that the same can be used as a rake;

FIG. 2 is a front perspective view similar to FIG. 1 but showing the rake head prior to being attached to the golf club handle;

FIG. 3 is a front perspective view of a rake head of the invention but showing the same in a collapsed or closed position;

DETAILED DESCRIPTION OF THE PREFERRED EMBODIMENT

Figure 4:
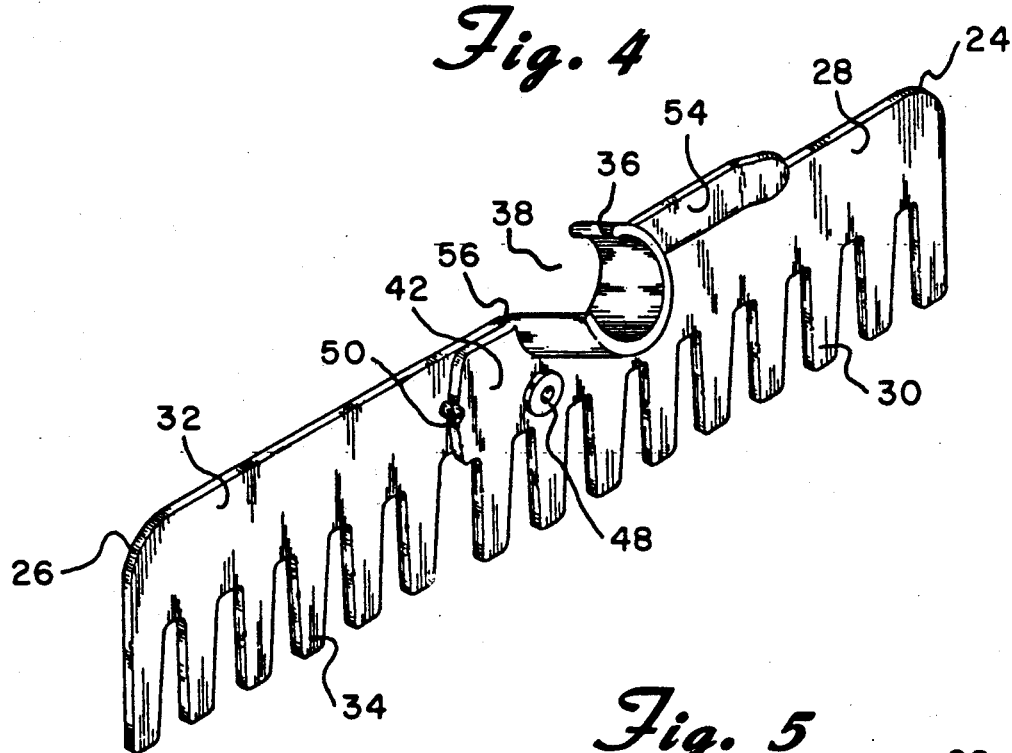
FIG. 4 is a rear perspective view of the rake head shown in FIGS. 1 and 2.

Referring now to the drawings in detail wherein like reference numerals have been used throughout the various figures to designate like elements, there is shown in FIGS. 1 and 2, the front perspective of a rake head constructed in accordance with the principles of the present invention and designated generally as 10. FIG. 2 shows the rake head 10 prior to being put into use while FIG. 1 shows the same secured to the handle 12 of a golf club 14. Golf club 14 can be essentially any conventional golf club which includes a head 16, an elongated shaft 18 and the handle 12. As is well known in the art, the handle 12 is comprised, at least in part, of a somewhat compressible material and tapers from a relatively narrow portion where it first joins with the shaft 18 to a wider portion 22 adjacent the free end of the handle. As shown in FIG. 1, the rake head 10 is adapted to be connected to the handle adjacent the free end 22 thereof.

The rake head 10 is comprised essentially of two main parts. A first rake blade 24 and a second rake blade 26. First rake 24 includes an elongated planar support member 28 having a plurality of teeth 30 which are substantially coplanar therewith but which extend transversely thereto as shown in the figures. Similarly, the second rake blade 36 includes an elongated planar support member 32 having a plurality of teeth 34 which are also substantially coplanar with the support member 32 but extend transversely thereto.

Figure 5:
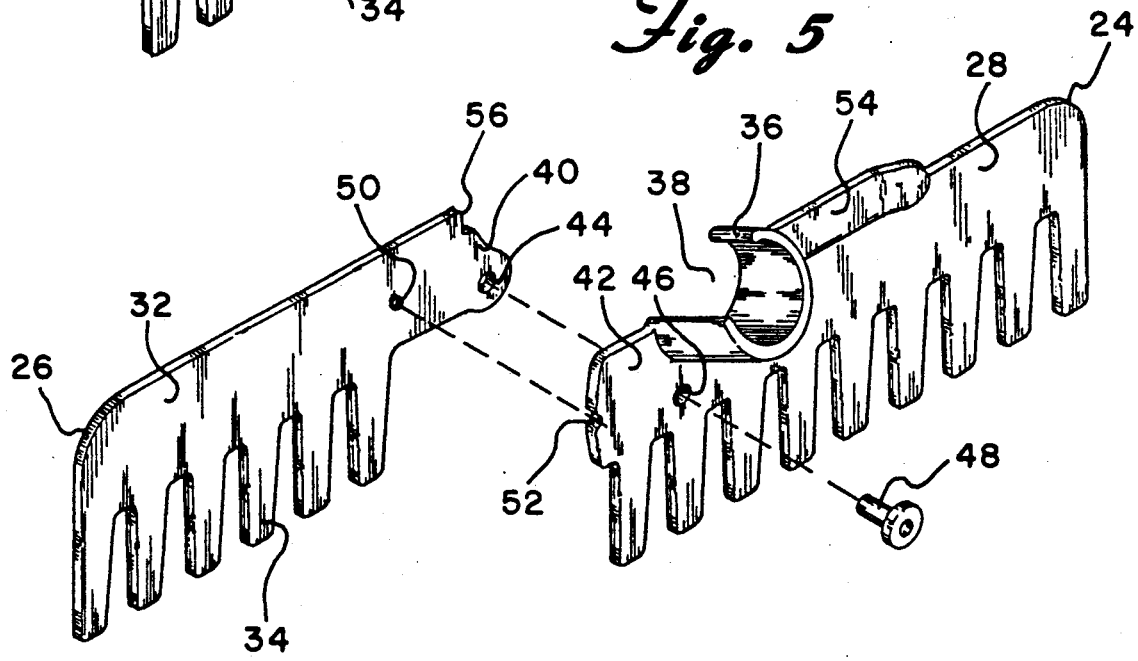
FIG. 5 is an exploded view of the rake head shown in FIG. 4 illustrating the manner in which the two rake blade halves are secured together.
Figure 6:
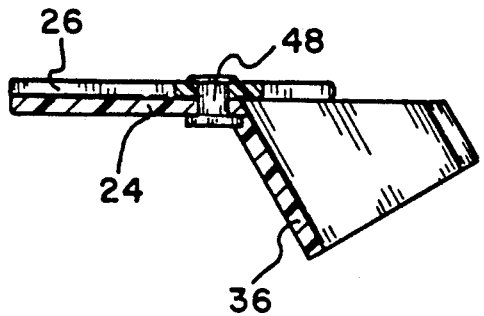
FIG. 6 is a cross-sectional view taken through the lines 6—6 of FIG. 3.

A substantially cylindrically shaped collar is secured to the first rake blade 24 at the rear thereof and extends outwardly and upwardly therefrom as is perhaps best shown in FIGS. 4 and 5. FIG. 6 most clearly illustrates that the axis of the substantially cylindrical collar 36 is not perpendicular to the plane of the first and second rake blades 24 and 26 but is angularly offset thereof. As can be seen from FIG. 1, this angular offset allows the teeth 30 and 34 of the rake head to be substantially perpendicular with the ground when the golf club 14 is held at a normal inclination for raking.

Although the collar 36 is substantially cylindrically shaped, it includes an opening 38 in the cylindrical wall thereof. This allows the collar 36 to be slid over the shaft 18 of the golf club at a position which is narrow enough to fit through the opening 38 and the rake head is then slid toward the handle 12 until it reaches a position where the handle is wider than the opening 38. Due to the somewhat compressive nature of the handle 12, the rake head 10 can be frictionally secured thereto.

While the planar support members 28 and 32 of the first and second rake blades 24 and 26 are substantially parallel to each other, they do not lie in exactly the same plane. Rather, the inner end 40 of the rake blade 26 overlies the inner end 42 of the rake blade 24. A hole 44 is formed in the end 40 and a similar hole 46 is formed in the end 42. A pivot pin in the form of a rivet or screw or the like passes through the holes 44 and 46 and is secured in place in a known manner. This allows the two rake blades 24 and 26 to be rotated with respect to each other.

FIGS. 1, 2, 4 and 5, of course, show the rake head in its fully opened or operative position wherein the first and second rake blades 24 and 26 are coextensive and all of the teeth 30 and 34 extend in the same direction. Although the two rake blades 24 and 26 are relatively free to move with respect to each other, they are maintained in the open position by a detent extension or protrusion 50 which extends rearwardly from the back surface of the inner end 40 of the planar support member 32. This projection 50 engages a cooperating detent recess 52 in the innermost portion 42 of the support member 28.

When the rake head is not needed and it is desired to collapse the same, the rake blades 24 and 26 are held in two different hands and rake blade 26 is moved downwardly away from the collar 36. Because the blades are slightly flexible, the detent 50 passes out of the recess 52 and under the inner surface of the support member 28. The first and second rake blades are rotated until they are in the position shown in FIG. 3 where the first rake blade 24 substantially overlies the second rake blade 26. In this position, the teeth 30 and 34 are extending in opposite directions and project only slightly past the tops of the other rake blade.

Because the first rake blade 24 substantially overlies the second rake blade 26 when the rake head is in its closed or collapsed position as shown in FIG. 3, the rake head is substantially half the size that it was when in the open position. As a result, the device can be more easily slipped into a golfer's pocket or clipped onto a golf bag or a golfer's belt. For this purpose, the device is also provided with an elongated clip 54 which is secured to the collar 36. The clip 54 is parallel to but spaced from the first rake blade 24.

The rake head 10 is also provided with a positive stop means for preventing the rake head from collapsing while being used as a rake. This is accomplished by a stop shoulder 56 which is located on the inner edge of the second blade 26 just above the pivot hole 44. As best shown in FIGS. 3 and 4, this shoulder 56 aligns itself with the collar 36 and actually forms an extension thereof through which the handle 12 of the golf club passes. When the rake head 10 is secured to the golf club handle 12 as shown in FIG. 1, the shoulder 56 presses against the tapered handle 12. As the rake is being used and upward forces are applied on the teeth 30 and 34, the second rake blade 36 is prevented from being rotated upwardly by the shoulder 56 which is abutting the handle 12.

The present invention may be embodied in other specific forms without departing from the spirit or essential attributes thereof and accordingly reference should be made to the appended claims rather than to the foregoing specification as indicating the scope of the invention.

I claim:

1. A rake head for attachment to the tapered handle of a golf club comprising:
    first and second rake blades, each of said rake blades including an elongated planar support member having a plurality of teeth substantially coplanar therewith but extending transversely thereto;
    a golf club handle engaging collar carried by said first rake blade and adapted to removably mount said rake head to the handle of a golf club;
    means pivotally mounting said first and second rake blades together so that the same can be pivoted between an open position wherein said elongated support members are in substantial alignment with each other and a closed position wherein said first rake blade substantially overlies said second rake blade.

2. The invention as claimed in claim 1 further including an elongated clip extending from said collar and parallel to but spaced from said first rake blade.

* * * * *